United States Patent
Abe et al.

(10) Patent No.: US 8,892,296 B2
(45) Date of Patent: Nov. 18, 2014

(54) POWER STATE DIAGNOSIS METHOD AND APPARATUS

(75) Inventors: Hirokazu Abe, Gunma (JP); Yoshiki Ninomiya, Gunma (JP); Toru Sakaguchi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/264,912

(22) PCT Filed: Sep. 6, 2011

(86) PCT No.: PCT/JP2011/070223
§ 371 (c)(1),
(2), (4) Date: Dec. 16, 2011

(87) PCT Pub. No.: WO2012/063541
PCT Pub. Date: May 18, 2012

(65) Prior Publication Data
US 2013/0218403 A1    Aug. 22, 2013

(30) Foreign Application Priority Data

Nov. 9, 2010 (JP) .................................. 2010-250736

(51) Int. Cl.
*B62D 5/04* (2006.01)
*B60R 16/03* (2006.01)

(52) U.S. Cl.
CPC .............. *B62D 5/0481* (2013.01); *B60R 16/03* (2013.01)
USPC ................ 701/32.8; 701/41; 701/43; 701/42; 180/446; 180/412; 180/443; 318/432; 318/430; 318/280; 318/293; 702/63

(58) Field of Classification Search
USPC ....................... 701/41, 43; 180/446, 412, 443; 318/696, 434; 702/63
See application file for complete search history.

(56) References Cited

FOREIGN PATENT DOCUMENTS

| JP | 2005-028900 A | 2/2005 |
|----|---------------|--------|
| JP | 2007274849 A | 10/2007 |
| JP | 2008012999 A | 1/2008 |
| JP | 4270196 B2 | 5/2009 |

OTHER PUBLICATIONS

International Search Report PCT/JP2011/070223; Oct. 18, 2011.

*Primary Examiner* — Adam Tissot
(74) *Attorney, Agent, or Firm* — Sughrue Mion, PLLC (57) ABSTRACT

[Problem]
An object of the present invention is to provide a power state diagnosis method and a power state diagnosis apparatus that pass and increase not only a d-axis current but also a q-axis current to a current value that a steering behavior does not occur to perform a diagnosis in the vector control of a motor, and determine that a power supply degraded, that the power supply is normal and that the diagnosis is not completed without giving an uncomfortable feeling to a driver, detecting a timing that there is not a driver, and needing to comprise a plurality of actuators.
[Means for solving the problem]
The present invention is a power state diagnosis method that diagnoses a power state of a vehicle which comprises an electrical control system supplied from a power supply and a motor controlled by a vector control method, comprising: gradually increasing a d-axis current to a current value that a steering behavior does not occur and applying the d-axis current, concurrently gradually increasing a q-axis current that is a rectangular-wave with positive and negative directions to the current value and applying the q-axis current, and determining degradation of the power supply when a voltage value of the power supply is equal to or less than a power supply threshold and a given period of time T1 elapses.

7 Claims, 9 Drawing Sheets

FIG.1

PRIOR ART

FIG.2

PRIOR ART

FIG. 3

PRIOR ART

POWER STATE DIAGNOSIS METHOD AND APPARATUS

CROSS REFERENCE TO RELATED APPLICATIONS

This application is a National Stage of International Application No. PCT/JP2011/070223 filed on Sep. 6, 2011, which claims priority from Japanese Patent Application No. 2010-250736, filed on Nov. 9, 2010, the contents of all of which are incorporated herein by reference in their entirety.

TECHNICAL FIELD

The present invention relates to a power state diagnosis method and a power state diagnosis apparatus that diagnose a state of a power supply (a battery) that is supplied to an electrical control system such as an electric power steering apparatus provided at a vehicle, and in particular to a power state diagnosis method and a power state diagnosis apparatus that incrementally apply a q-axis current with a d-axis current to diagnose a power state of an electrical control system which controls a motor by a vector control system.

BACKGROUND ART

Heretofore, an electric power steering apparatus is known as one example of electrical control systems that are supplied from an automotive battery as a power supply. Although the electric power steering apparatus is an apparatus that controls energizing amount to a motor depending on a steering state of a steering wheel and provide a steering assist torque (an assist force), its electricity consumption is considerably high. For this reason, in the case that capability of a battery dropped (hereinafter referred to as "degradation"), there is a possibility that the energizing amount to the motor which generates the steering assist torque is limited and a given steering torque is not obtained, and there is also a possibility of causing a reduction in power-supply voltage to other electrical control systems that operate simultaneously. Therefore, before becoming such a situation, it is important to detect battery degradation in advance and prompt battery exchange for a driver.

Figure 1:
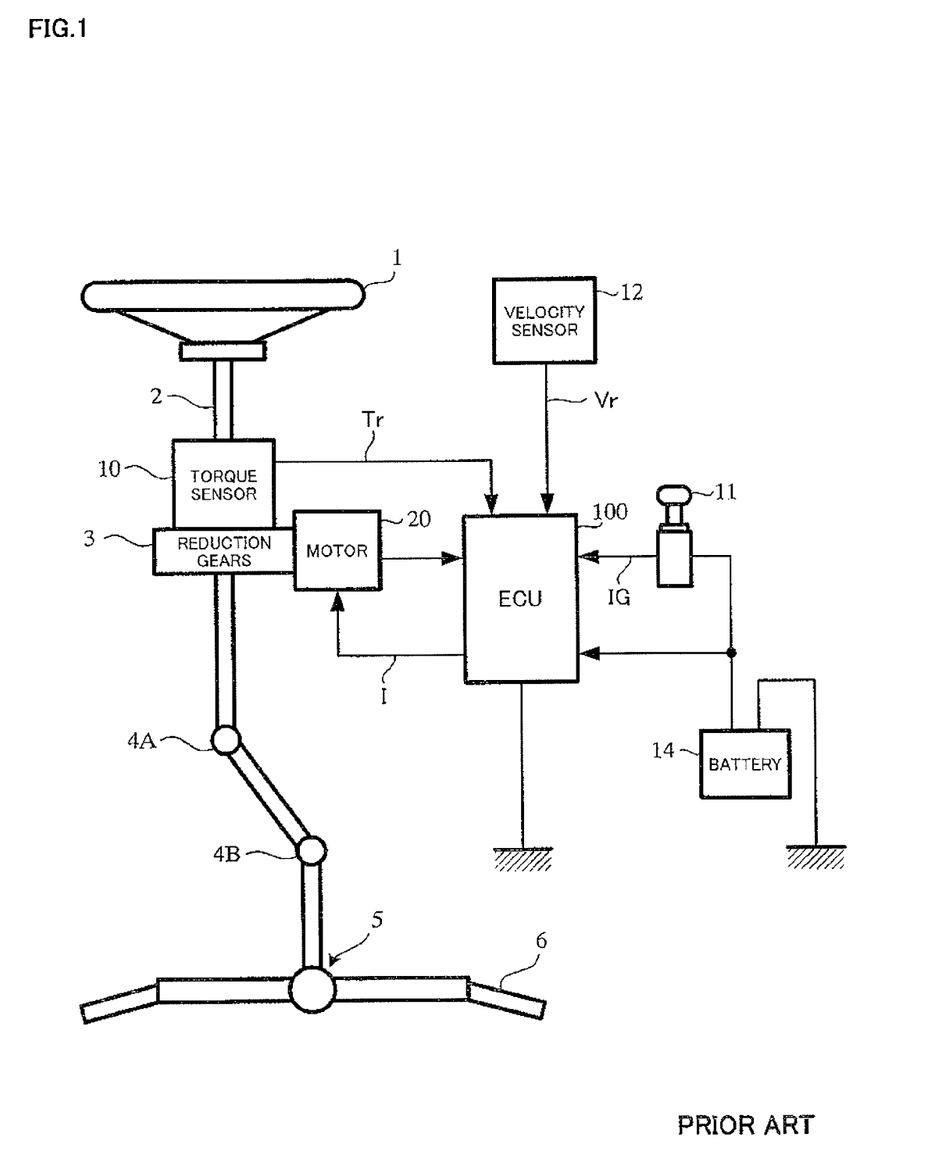
FIG. 1 is a configuration diagram illustrating a general steering mechanism.

Here, as one example of electrical control systems, a general configuration of an electric power steering apparatus will be described with reference to FIG. 1. A column shaft 2 connected to a steering wheel (handle) 1 is connected to tle rods 6 of steered wheels through reduction gears 3, universal joints 4A and 4B, and a rack and pinion mechanism 5. The column shaft 2 is provided with a torque sensor 10 for detecting a steering torque Tr of the steering wheel 1, and a motor 20 for assisting the steering force of the steering wheel 1 is connected to the column shaft 2 through the reduction gears 3. Electric power is supplied to an ECU (Electronic Control Unit) 100 for controlling the electric power steering apparatus etc. from a battery 14, and an ignition signal IG is inputted into the ECU 100 through an ignition key 11. A calculation and control section 110 within the ECU 100 calculates a current command value I of an assist command based on the steering torque Tr detected by the torque sensor 10 and a velocity Vr detected by a velocity sensor 12, and controls the motor 20 based on the calculated current command value I. In the case of the vector control, the current command value I comprises a q-axis current command value Iq with respect to a q-axis for controlling a torque which is a coordinate axis of a rotor magnet and a d-axis current command value Id with respect to a d-axis for controlling the strength of a magnetic field, and since the q-axis and the d-axis have a relation of 90-degree, current corresponding to each axis is controlled by that vector.

Furthermore, the velocity Vr can be obtained from a CAN (Controller Area Network) and then inputted into the ECU 100. It is also possible to additionally use a steering angle θ obtained from a steering angle sensor for calculating the current command value I.

Figure 2:
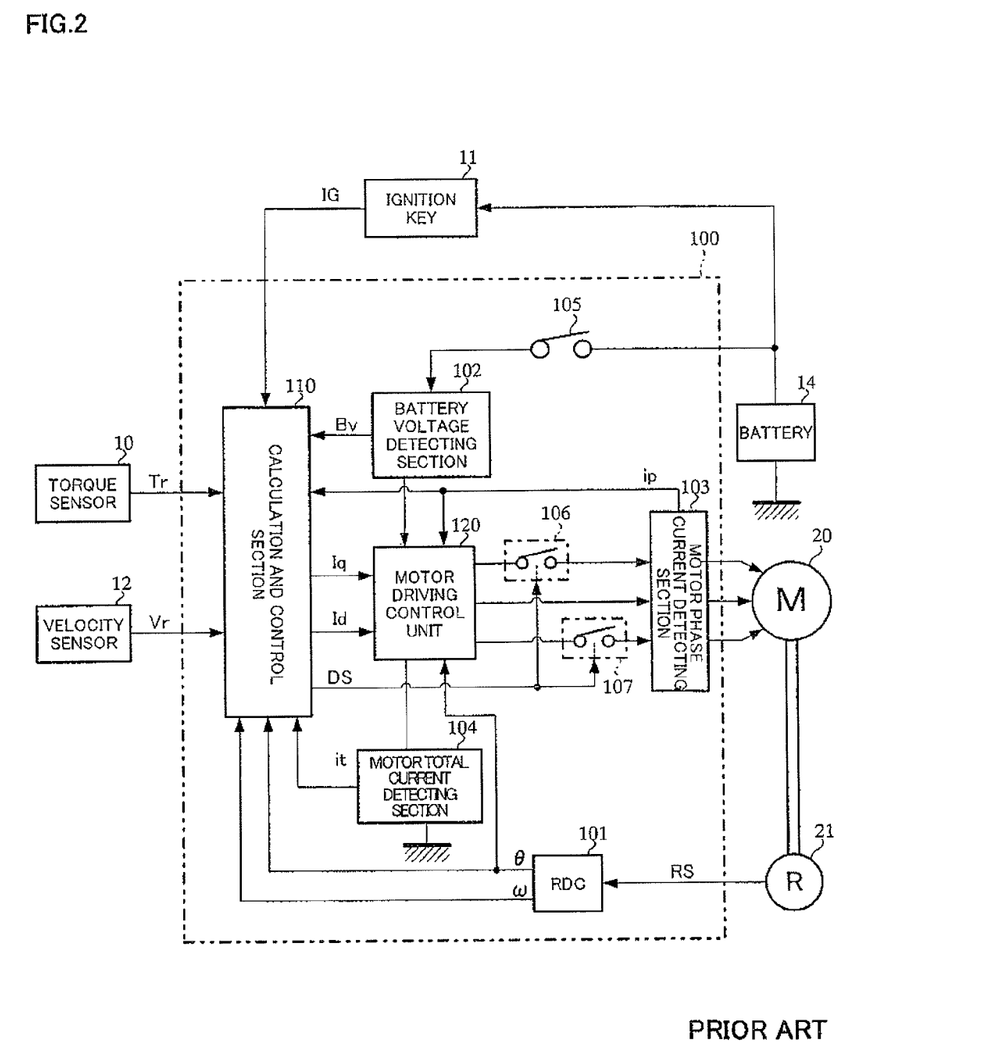
FIG. 2 is a block diagram showing a configuration example of a conventional control unit.

Configuration and operations of the ECU 100 that drives and controls the motor 20 will be described with respect to the vector control.

In the case of the vector control, the motor 20 is a brushless DC motor (in this embodiment, a three-phase brushless DC motor), since a rotational angle (the steering angle) θ and a motor angular velocity ω of the motor 20 are necessary for control, a resolver 21 as an angle detecting element is connected to the motor 20, and the ECU 100 is provided with a resolver-to-digital converting circuit (RDC) 101 that converts an alternating-current resolver detection signal RS into a digital steering angle θ and a digital motor angular velocity ω. The ECU 100 mainly comprises functions (software) of a CPU (also including an MPU (Micro Processor Unit), an MCU (Micro Controller Unit) and so on), and comprises the calculation and control section 110 that performs necessary calculation processing and total control. The calculation and control section 110 obtains the q-axis current command value Iq and the d-axis current command value Id by calculations based on the steering torque Tr from the torque sensor 10, the velocity Vr from the velocity sensor 12 (or the CAN), and the steering angle θ and the motor angular velocity ω from the RDC 101, and inputs the q-axis current command value Iq and the d-axis current command value Id into a motor driving control section 120 to perform the vector control. The ignition signal IG from the ignition key 11, a battery voltage Bv detected by a battery voltage detecting section 102, phase currents ip of the motor 20 detected by a motor phase current detecting section 103, and a total current it of the motor 20 detected by a motor total current detecting section 104 are inputted into the calculation and control section 110. Electric power is supplied to the motor driving control section 120 from the battery 14 via a power relay 105, and the battery voltage Bv detected by the battery voltage detecting section 102 is inputted into the calculation and control section 110.

The motor driving control section 120 that inputs the q-axis current command value Iq and the d-axis current command value Id, comprises an inverter circuit etc. of an FET bridge circuit that drives the motor 20 after performing controls such as a PI control, a PWM control and so on. Driving currents of three phases are supplied to the motor 20 via motor relays 106 and 107, each phase current ip is detected by the motor phase current detecting section 103, and the detected phase current ip is inputted into the calculation and control section 110 and the motor driving control section 120. The motor relays 106 and 107 are ON/OFF controlled by a driving signal DS from the motor driving control section 120. The total current it which is supplied to the motor 20, is detected by the motor total current detecting section 104. And then the detected total current it is inputted into the calculation and control section 110.

Figure 3:
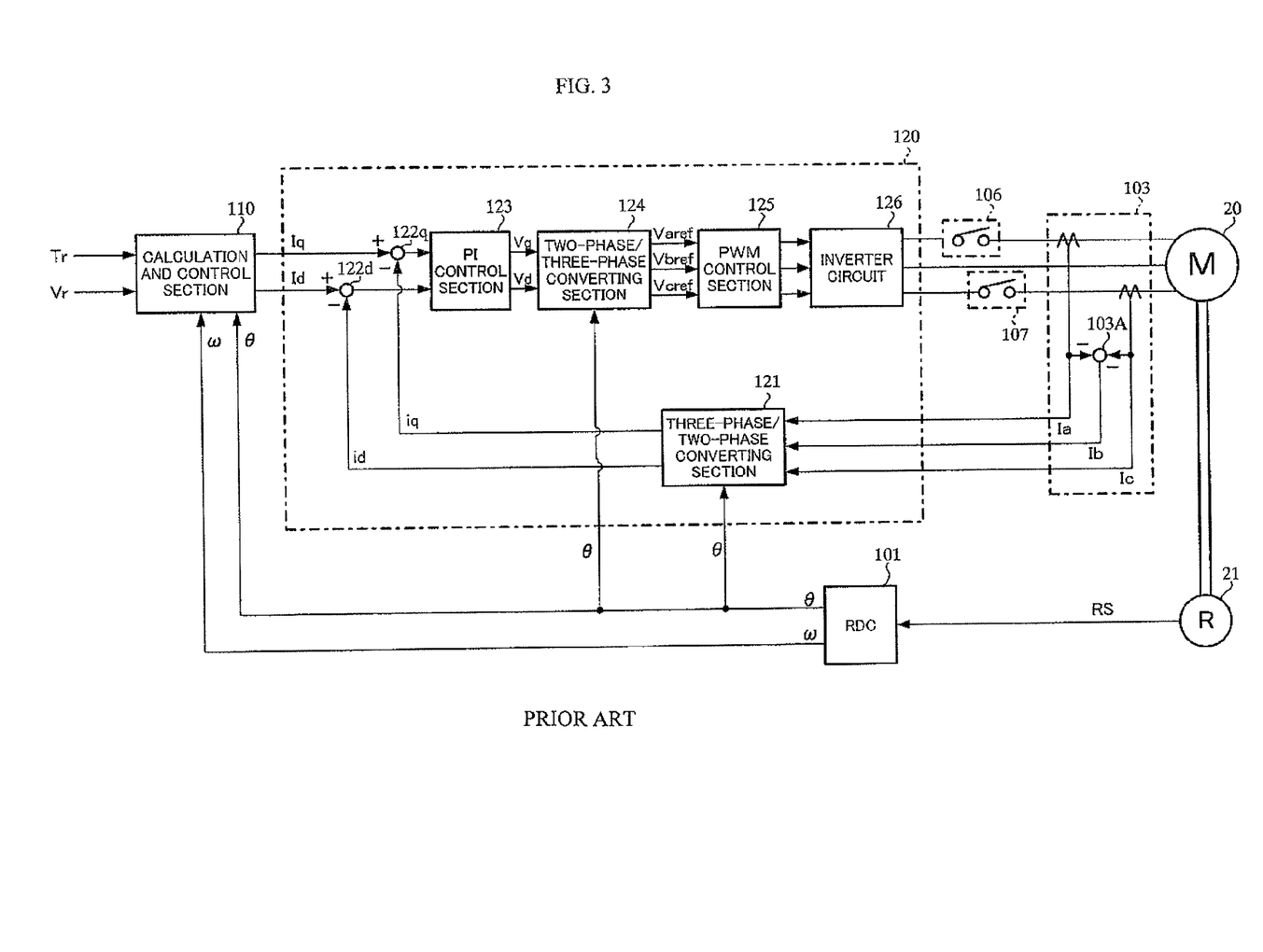
FIG. 3 is a block diagram showing a configuration example of a motor driving control unit based on the vector control.

As shown in FIG. 3, since the motor driving control section 120 becomes a current feedback control of the PWM control, with respect to the q-axis current command value Iq and the d-axis current command value Id that are calculated by the calculation and control section 110 based on the steering torque Tr, the velocity Vr, the steering angle θ and the motor angular velocity ω, it is necessary to detect actual motor phase currents Ia, Ib and Ic of the motor 20 by the motor phase current detecting section 103 and feed back in the form of two phases for the vector control. For this reason, the motor phase current detecting section 103 detects the motor phase currents Ia and Ic, since there is a relation of Ia+Ib+Ic=0 with respect to the motor phase currents, a subtracting section 103A calculates the motor phase current Ib based on Ib=−(Ia+Ic), and a three-phase/two-phase converting section 121 collaborates with the steering angle θ to convert the motor phase currents Ia, Ib and Ic into two-phase motor currents iq and id for the feedback control. The motor currents iq and id are fed back to subtracting sections 122q and 122d, respectively. The subtracting section 122q calculates a deviation ΔIq(=Iq−iq) of the q-axis current command value Iq and the motor current iq, and the subtracting section 122d calculates a deviation ΔId (=Id−id) of the d-axis current command value Id (in general, it is Id0) and the motor current id.

The current is controlled so that the deviations ΔIq and ΔId from the subtracting sections 122q and 122d become "0", the deviations ΔIq and ΔId are inputted into a proportional-integral (PI) control section 123, and PI-controlled voltage command values Vq and Vd are outputted from the PI control section 123. And then, in fact, since it is necessary to apply three-phase current to the motor 20, a two-phase/three-phase converting section 124 collaborates with the steering angle θ to convert the voltage command values Vq and Vd into three-phase voltage command values Varef, Vbref and Vcref. The three-phase voltage command values Varef, Vbref and Vcref are inputted into a PWM control section 125. Based on the voltage command values Varef, Vbref and Vcref, the PWM control section 125 generates PWM control signals that control duty ratios. An inverter circuit 126 comprised of an FET bridge circuit, applies currents to the motor 20 based on the PWM control signals, and applies the motor phase currents Ia, Ib and Ic so that the deviations ΔIq and Δid become "0" to drive the motor 20. The motor relays 106 and 107 are connected between the inverter circuit 126 and the motor 20, and ON/OFF controlled by the ignition key 11 via the calculation and control section 110.

In order to normally stabilize and assist steering operations of a driver, with respect to the battery 14 that is supplied to an electrical control system such as an electric power steering apparatus as described above, it is necessary to maintain the power-supply voltage of the battery 14 in a given and stable range (for example, 10V-15V). However, failures such as the battery degradation (the voltage drop) etc. due to various reasons, occur. Therefore, diagnosis methods and diagnosis apparatuses that are capable of detecting the degradation of the battery and diagnosing the state of the battery before the battery 14 degrades to such a degree that the battery 14 becomes a hindrance to normal driving of the vehicle, are proposed.

As an apparatus that detects the degradation of an automotive battery, for example, an electric power steering apparatus disclosed in Japanese Patent Application Laid-Open No. 2005-28900 (Patent Document 1) comprises two pairs of electric motors that steer wheels, and diagnoses the battery state based on the amount of descent of the battery's terminal voltage when a large current is supplied to these electric motors from a battery. Further, the electric power steering apparatus disclosed in Patent Document 1, drives at least one of a plurality of actuators in a rightward steering direction while driving at least another of the plurality of actuators in a leftward steering direction, and controls output torques of actuators that drive in the rightward steering direction and the leftward steering direction respectively so that wheels are not steered, and further determines the battery state based on the amount of descent of the terminal voltage that a voltage sensor outputs during those actuators drive.

Furthermore, a battery state diagnosis apparatus disclosed in Japanese Patent No. 4270196 (Patent Document 2), comprises a d-axis energizing control means that energizes an electric motor so as to limit only a d-axis armature current in a dq-axes coordinate system which comprises of a d-axis being an action axis of a magnetic flux created by a permanent magnet of a rotor of a brushless DC motor and a q-axis that is perpendicular to the d-axis to less than or equal to a given upper-limit current value and pass the limited d-axis armature current, and not pass a q-axis armature current.

THE LIST OF PRIOR ART DOCUMENTS

Patent Documents

Patent Document 1: Japanese Patent Application Laid-Open No. 2005-28900
Patent Document 2: Japanese Patent No. 4270196

SUMMARY OF THE INVENTION

Problems to be Solved by the Invention

However, since the apparatus described in Patent Document 1, drives at least two of the plurality of actuators in the rightward steering direction and the leftward steering direction and diagnoses, there is a problem that a plurality of actuators have to be comprised, hence a problem that it is impossible to apply to a general system without such a configuration, occurs. Further, since the apparatus disclosed in Patent Document 2 passes only the d-axis current, if making a control period of current control fast, a problem that an expensive MCU or an exclusive MCU is necessary, occurs, it is difficult to raise a responsiveness due to conflicting demands of a noise suppression effect of the current control and the responsiveness of the current control, as a result, the q-axis current flows and a motor torque occurs. For this reason, it gives an uncomfortable feeling to the driver, a function that detects a timing that there is not a driver and diagnoses, becomes necessary. Furthermore, even passing a current to the d-axis, due to the limits of the directionality of the magnetic field, the q-axis current flows, therefore, it is necessary to limit the d-axis current to a level that a problem does not occur.

The present invention has been developed in view of the above described circumstances, and an object of the present invention is to provide a power state diagnosis method and a power state diagnosis apparatus that pass and gradually increase (progressively increase) the d-axis current and the q-axis current to a current value that a steering behavior does not occur to perform a power diagnosis in the vector control of a motor, and certainly determine that the power supply degraded, that the power supply is normal and that the diagnosis is not completed by a simple method without giving an uncomfortable feeling to a driver, detecting the timing that there is not a driver, and needing to comprise a plurality of actuators.

Means for Solving the Problems

The present invention relates to a power state diagnosis method that diagnoses a power state of a vehicle which comprises an electrical control system supplied from a power supply and a motor controlled by a vector control method, the above-described object of the present invention is achieved by that comprising: gradually increasing a d-axis current to a current value that a steering behavior does not occur and applying said d-axis current, concurrently gradually increasing a q-axis current that is a rectangular-wave with positive and negative directions to said current value and applying said q-axis current, and determining degradation of said power supply when a voltage value of said power supply is equal to or less than a power supply threshold and a given period of time T1 elapses.

The above-described object of the present invention is more effectively achieved by that in a case that additionally, a voltage of said power supply is equal to or more than a diagnosable voltage that is necessary to continue said diagnosis, said degradation is determined; or when a steering angle or a motor angular velocity of said motor becomes equal to or more than a respective threshold, terminating said diagnosis and determining that said diagnosis is not completed; or when a given period of time T2 elapses from a time when said d-axis current and said q-axis current are applied, setting said d-axis current as a constant value, when a given period of time T3 (>T2) elapses, setting said q-axis current as a constant value; or said electrical control system is an electric power steering apparatus that drives said motor based on said d-axis current and said q-axis current that are calculated based on at least a steering torque from a torque sensor and provides a steering system with an assist torque.

Further, the present invention relates to a power state diagnosis apparatus that diagnoses a power state of a vehicle which comprises an electrical control system supplied from a power supply and a motor controlled by a vector control method, the above-described object of the present invention is achieved by that comprising: a d-axis current generating section that gradually increases a d-axis current to a current value that a steering behavior does not occur and applies said d-axis current; a q-axis current generating section that gradually increases a q-axis current that is a rectangular-wave with positive and negative directions to said current value and applies said q-axis current; a power supply voltage determining section that determines whether a voltage value of said power supply is equal to or less than a power supply threshold or not; a time determining section that determines elapse of the time; and a diagnosis determining section that determines degradation of said power supply when said power supply voltage determining section determines that said voltage value is equal to or less than said power supply threshold, and said time determining section determines that a period of time T1 elapses after said voltage value becomes equal to or less than said power supply threshold. The above-described object of the present invention is more effectively achieved by that comprising: a diagnosable voltage determining section that determines whether a voltage of said power supply is equal to or more than a diagnosable voltage that is necessary to continue said diagnosis or not, and said degradation is determined when said diagnosable voltage determining section determines that said voltage of said power supply is equal to or more than said diagnosable voltage; or further comprising: a steering angle determining section that determines whether a steering angle of said motor is equal to or more than a threshold θ1 or not; and a motor angular velocity determining section that determines whether a motor angular velocity is equal to or more than a threshold ω1 or not, and terminating said diagnosis and said diagnosis determining section determines that said diagnosis is not completed when said steering angle determining section determines said steering angle of said motor is equal to or more than said threshold θ1, or when said motor angular velocity determining section determines said motor angular velocity is equal to or more than said threshold ω1; or said electrical control system is an electric power steering apparatus that drives said motor based on said d-axis current and said q-axis current that are calculated based on at least a steering torque from a torque sensor and provides a steering system with an assist torque.

Effects of the Invention

According to the power state diagnosis method and the power state diagnosis apparatus of the present invention, it is possible to obtain a maximal detection effect by using not only the d-axis current but also the q-axis current for detecting the power state, and passing an (AC) rectangular-wave current with positive and negative directions to the q-axis and increasing to the current value that the steering behavior does not occur.

Since the present invention has a function that terminates the diagnosis in the case that the motor rotational angle (the steering angle) or the motor rotational velocity exceeded a predetermined threshold and determines that the diagnosis is not completed, it is possible to suppress occurrences of abnormal noises and tiny vibrations with respect to the driver. Further, in the case of normalcy, since the present invention stops the diagnosis when a given period of time elapsed, it is economical and efficient.

MODE FOR CARRYING OUT THE INVENTION

In the present invention, by adding applying a q-axis current as a q-axis current command value Iq to a power state detection that there were limits in the detection accuracy only by applying a d-axis current as a d-axis current command value Id, and applying the d-axis current and the q-axis current while gradually increasing the d-axis current and the q-axis current to a current value that a steering behavior does not occur, making it possible to obtain a maximal detection effect. In doing so, since passing an (AC) rectangular-wave current with the positive and negative directions to the q-axis, a steering behavior only for one direction does not occur. Although there is a possibility that phenomena of abnormal noises and tiny vibrations with respect to a driver occur, to limit this as much as possible, in the case that a motor rotational angle (a steering angle) or a motor rotational velocity became equal to or more than a predetermined value (threshold), the present invention has a function that terminates a power diagnosis and determines that the diagnosis is not completed.

Hereinafter, embodiments of the present invention will be described in detail with reference to the drawings.

Figure 4:
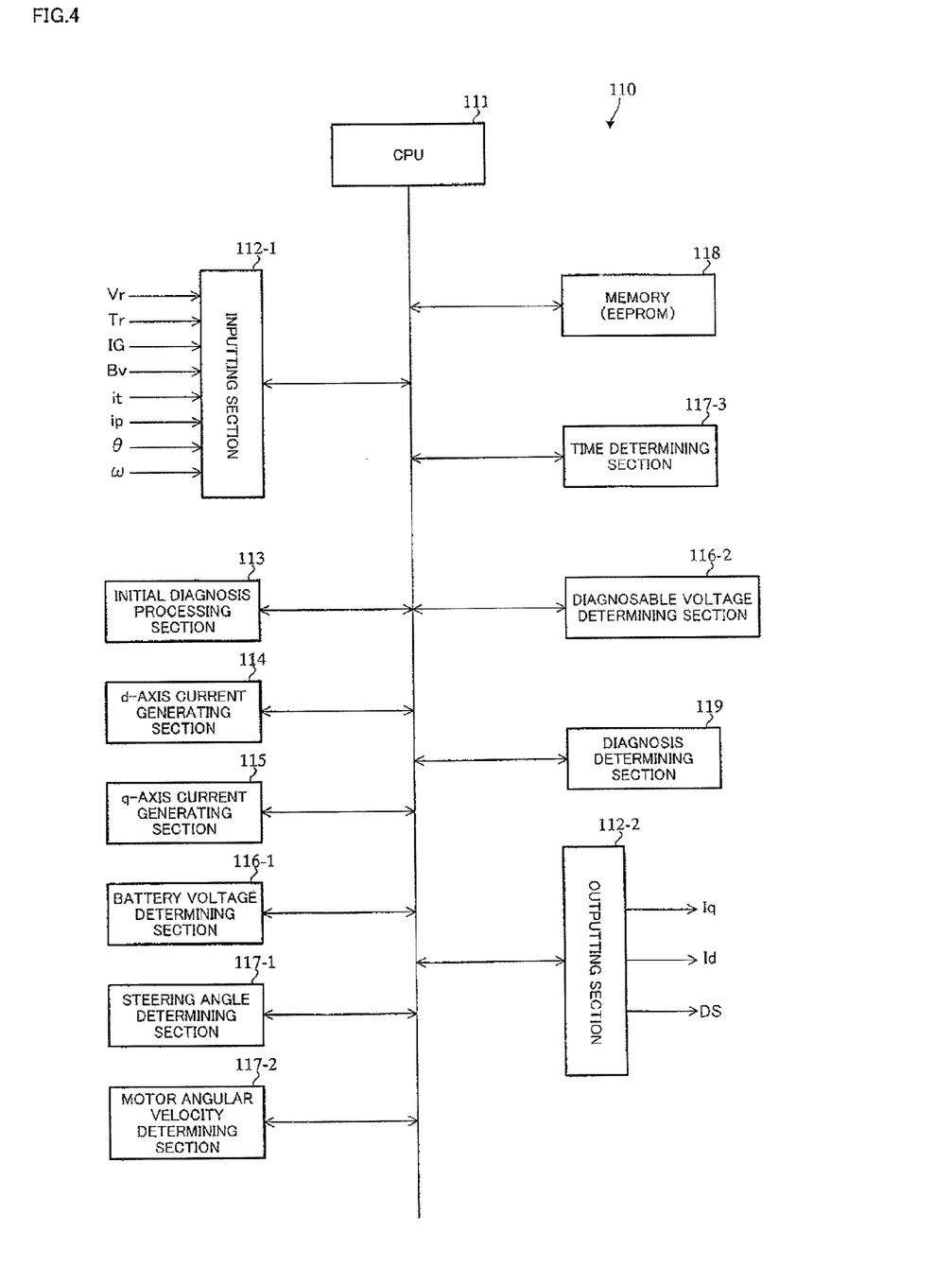
FIG. 4 is a block diagram showing an example of a functional configuration that the present invention has.

FIG. 4 shows an example of a functional configuration of a calculation and control section 110 relating to the present invention. As shown in FIG. 4, the calculation and control section 110 comprises a CPU 111 that performs a total control and calculation processing, an inputting section 112-1 and an outputting section 112-2 are connected to the CPU 111, a velocity Vr, a steering torque Tr, an ignition signal IG, a battery voltage Bv, a motor total current it, motor phase currents ip, a steering angle 9 and a motor angular velocity co are inputted into the inputting section 112-1, a q-axis current command value Iq (including a q-axis current for diagnosis), a d-axis current command value Id (including a d-axis current for diagnosis) and a driving signal DS are outputted from the outputting section 112-2. When the ignition signal IG is inputted into the inputting section 112-1, the driving signal DS is outputted from the outputting section 112-2 and motor relays 106 and 107 are switched to "ON".

Furthermore, an initial diagnosis processing section 113, a d-axis current generating section 114, a q-axis current generating section 115, a battery voltage determining section 116-1, a steering angle determining section 117-1, a motor angular velocity determining section 117-2, a time determining section 117-3, a memory 118 (for example, an EEPROM), a diagnosable voltage determining section 116-2 and a diagnosis determining section 119 are mutually connected to the CPU 111. The initial diagnosis processing section 113 performs an initial diagnosis within a given time period when an ignition key 11 is switched to "ON". The d-axis current generating section 114 generates the d-axis current for power diagnosis as the d-axis current command value Id. The q-axis current generating section 115 generates the q-axis current for power diagnosis as the q-axis current command value Iq. The battery voltage determining section 116-1 compares and determines whether the battery voltage Bv is equal to or less than a given threshold Bv1 or not. The steering angle determining section 117-1 compares and determines whether the steering angle θ is equal to or less than a given threshold θ1 or not. The motor angular velocity determining section 117-2 compares and determines whether the motor angular velocity ω is equal to or less than a given threshold ω1 or not. The time determining section 117-3 times from a given time and determines whether a certain period of time elapsed or not. The memory 118 stores various kinds of data and information. The diagnosable voltage determining section 116-2 compares and determines whether the battery voltage Bv is equal to or more than a diagnosable voltage Bv2 or not. The diagnosis determining section 119 determines diagnosed states of that the power supply degraded, that the power supply is normal and that the diagnosis is not completed. Moreover, with respect to the d-axis current generating section 114 and the q-axis current generating section 115, it is possible to utilize a configuration that separately generates and outputs the d-axis current and the q-axis current by a single current generating section.

The threshold Bv1 of the battery voltage Bv is a threshold for that it can be confirmed that a battery 14 degraded and a current value is adjusted not to lower the battery voltage Bv any more, when a voltage level drops too much, it is impossible to maintain a current control. Further, since it is impossible to maintain the current control when a battery level (the voltage level) drops too much, the diagnosable voltage Bv2 is a voltage value that is set for maintaining a normal diagnosis and becomes a value less than the threshold Bv1. That is to say, Bv1>Bv2 holds. The d-axis current generating section 114 is a section that gradually and linearly increases a direct current and outputs a constant current after reaching a given value. Although the d-axis current generating section 114 can be comprised of an integrator and so on, the d-axis current generating section 114 can also be comprised of software. The q-axis current generating section 115 is a section that gradually increases the amplitude of an AC rectangular-wave and outputs the rectangular-wave with the constant amplitude when a given period of time elapsed, and so on. Although the q-axis current generating section 115 can be comprised of a variable output type oscillator, an amplifier and so on, the q-axis current generating section 115 can also be comprised of software.

Figure 5:
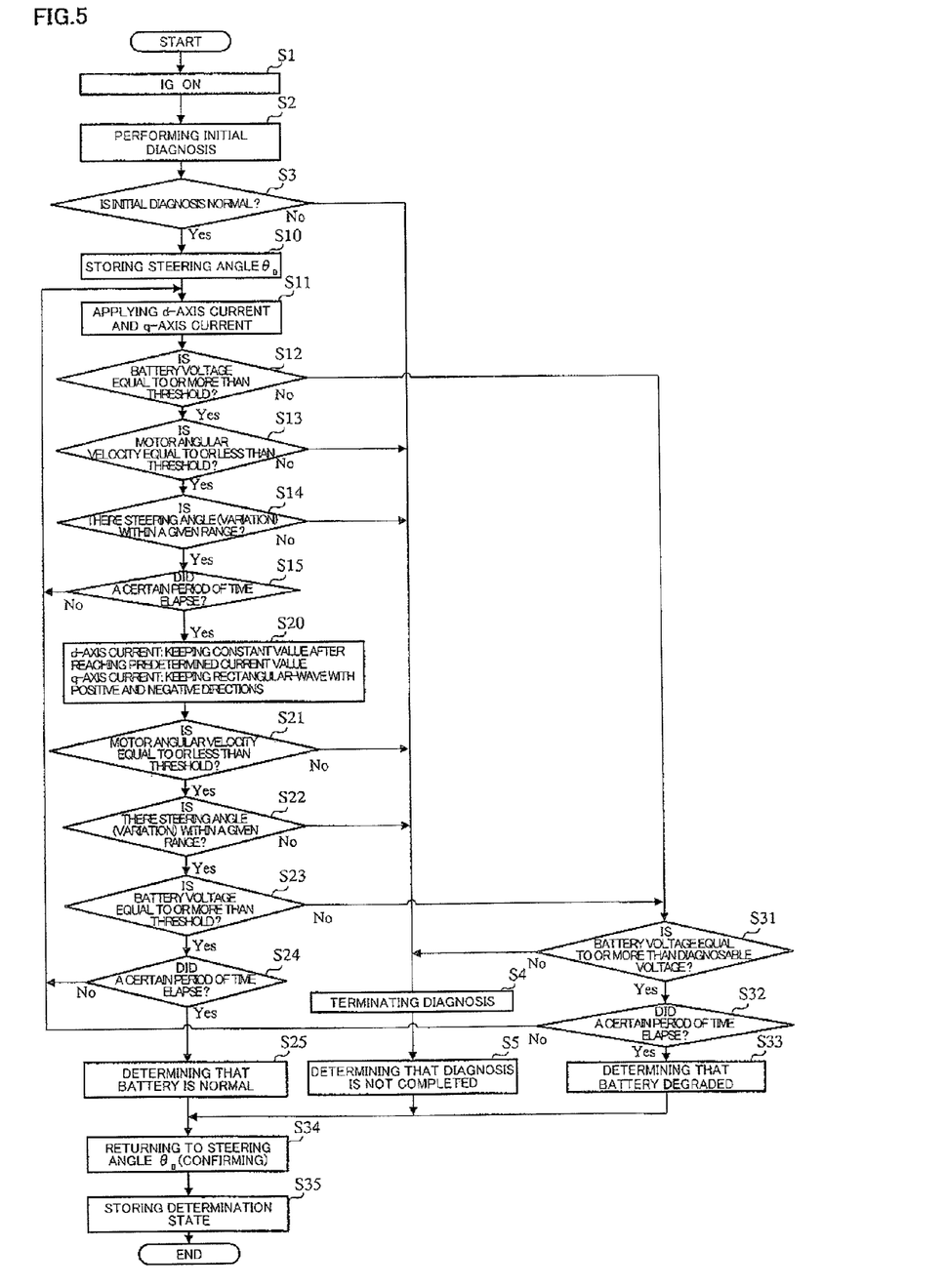
FIG. 5 is a flowchart showing an operation example of the present invention.

FIG. 5 shows a total operation example of the present invention. As shown in FIG. 5, when the ignition key 11 becomes "ON" (step S1), the initial diagnosis processing section 113 performs the given initial diagnosis (relating to a motor temperature, disconnecting, short and so on) that is necessary for assist (step S2). A determination that the initial diagnosis is normal or abnormal, is performed (step S3), in the case of determining that the initial diagnosis is not normal, the diagnosis is terminated (step S4), the diagnosis determining section 119 determines that the diagnosis is not completed (step S5), confirming whether it is a steering angle $θ_0$ stored in the memory 118 or not (step S34), a determination state is stored in the memory 118 (step S35), the operation is finished.

In the above step S3, in the case of determining that the initial diagnosis is normal, a steering angle θ from a resolver-to-digital converting circuit (RDC) 101, is stored in the memory 118 via the inputting section 112-1 (step S10), the d-axis current generating section 114 generates the d-axis current that linearly and progressively increases and applies the d-axis current to a motor driving control section 120, the q-axis current generating section 115 generates the q-axis current that is an AC rectangular-wave with positive and negative directions and progressively increases and applies the q-axis current to the motor driving control section 120 (step S11). Progressively increasing of the d-axis current generation and the q-axis current generation is performed up to the current value that the steering behavior does not occur, since the q-axis current becomes the AC rectangular-wave with positive and negative directions, even if it is a state that the steering behavior occurs, the steering behavior for one direction does not occur.

In a state that the d-axis current and the q-axis current are applied, the battery voltage determining section 116-1 determines whether the battery voltage Bv is equal to or less than the given threshold Bv1 or not (step S12), since it is normal in the case that the battery voltage Bv is equal to or more than the threshold Bv1, the motor angular velocity determining section 117-2 determines whether the motor angular velocity ω from the RDC 101 is equal to or less than the given threshold ω1 or not (step S13), in the case that the motor angular velocity ω is equal to or less than the given threshold col, further, the steering angle determining section 117-1 determines that whether there is the steering angle θ within a given range (−θ1<θ<θ1) or not (step S14), in the case that there is the steering angle θ within the given range (−θ1<θ<θ1), returning to the above step S11 and repeating the above operations until a certain period of time T1 elapses by timing from a time when the d-axis current and the q-axis current are applied by means of the time determining section 117-3 (step S15). Furthermore, in the above step S13, in the case that the motor angular velocity determining section 117-2 determines that the motor angular velocity ω exceeds the given threshold ω1, skipping to the above step S4 and becoming diagnosis termination. Moreover, in the above step S14, in the case that the steering angle determining section 117-1 determines that the steering angle θ deviates from the given range (−θ1<θ<θ1), skipping to the above step S4 and becoming diagnosis termination.

On the other hand, in the above step S15, in the case that the time determining section 117-3 determines that the certain period of time T1 elapsed, although the d-axis current reaches a current value that is a predetermined limit and then maintains a constant value, the q-axis current maintains progressively-increasing applying the rectangular-wave with positive and negative directions (step S20). And then, the motor angular velocity determining section 117-2 determines whether the motor angular velocity ω from the RDC 101 is equal to or less than the given threshold ω1 or not (step S21), in the case that the motor angular velocity ω is equal to or less than the threshold ω1, further, the steering angle determining section 117-1 determines that whether there is the steering angle θ within the given range (−θ1<θ<θ1) or not (step S22), in the case that there is the steering angle θ within the given range (−θ1<θ<θ1), the battery voltage determining section 116-1 determines whether the battery voltage Bv is equal to or more than the given threshold Bv1 or not (step S23). And then, in the case that the battery voltage Bv is equal to or more than the given threshold Bv1, further, returning to the above step S11 and repeating the above operations until a certain period of time T2 elapses by timing from the time when the d-axis current and the q-axis current are applied by means of the time determining section 117-3 (step S24).

In the above step S24, in the case that the time determining section 117-3 determines that the certain period of time T2 elapsed, the diagnosis determining section 119 determines that the battery 14 is normal (step S25), returning to the steering angle θ₀ stored in the memory 118 (step S34), the determination state is stored in the memory 118 (step S35), the operation is finished. Furthermore, in the above step S21, in the case that the motor angular velocity determining section 117-2 determines that the motor angular velocity ω exceeds the threshold ω1, skipping to the above step S4 and becoming diagnosis termination. Moreover, in the above step S22, in the case that the steering angle determining section 117-1 determines that the steering angle θ deviates from the given range (−θ1<θ<θ1), skipping to the above step S4 and becoming diagnosis termination.

On the other hand, in the above steps S12 and S23, in the case that the battery voltage determining section 116-1 determines that the battery voltage Bv is less than the threshold Bv1, the diagnosable voltage determining section 116-2 determines whether the battery voltage Bv is equal to or more than the diagnosable voltage Bv2 or not (step S31), in the case that the battery voltage Bv is equal to or more than the diagnosable voltage Bv2, the time determining section 117-3 determines whether a certain period of time T3 elapsed or not (step S32), in the case of determining the certain period of time T3 elapsed, the diagnosis determining section 119 determines that the battery 14 degraded (step S33), returning to the steering angle θ₀ stored in the memory 118 (step S34), and then the determination state is stored in the memory 118 (step S35), the operation is finished. In the above step S31, in the case that the battery voltage Bv is less than the diagnosable voltage Bv2, becoming diagnosis termination (step S4). In the above step S32, in the case that the certain period of time T3 does not elapse, returning to the above step S11 and repeating the above operations.

Total processing flow is described as above. Next, concrete embodiments will be described by using time charts.

Figure 6:
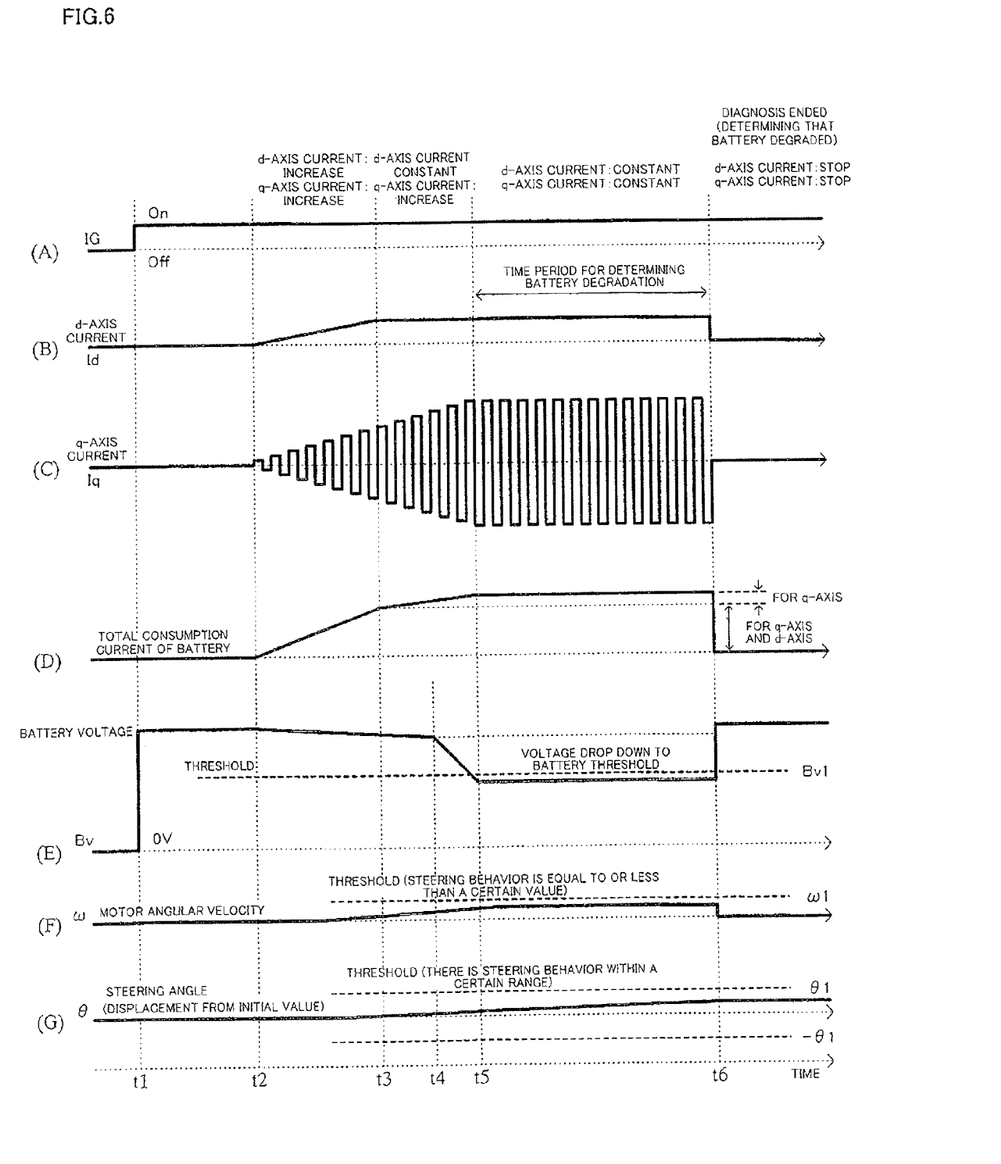
FIG. 6 is a time chart showing an operation example (the first embodiment: battery degraded) of the present invention.

FIG. 6 is a time chart showing an operation example that determines that the battery degraded, FIG. 6(A) shows "ON/OFF" of the ignition key 11 or the ignition signal IG, FIG. 6(B) shows the d-axis current Id, FIG. 6(C) shows the q-axis current Iq, FIG. 6(D) shows a total consumption current of the battery 14, FIG. 6(E) shows the battery voltage Bv, FIG. 6(F) shows the motor angular velocity ω, and FIG. 6(G) shows the steering angle θ.

As shown in FIG. 6(A), when the ignition key 11 is switched to "ON" at a time t1, the battery voltage Bv also becomes a given value and electric power is supplied (see FIG. 6(E)). And then, as shown in FIGs. 6(B) and 6(C), although the d-axis current Id and the q-axis current Iq are generated and applied at a time t2, concurrently, the d-axis current Id and the q-axis current Iq are gradually increased (progressively increased), and although the d-axis current Id becomes a constant value at a time t3, even after that the q-axis current Iq gradually increases. And then, in this embodiment, the battery voltage Bv drops after a time t4, when the battery voltage Bv becomes less than the threshold Bv1, this situation is detected by the battery voltage determining section 116-1, the q-axis current Iq also becomes a constant value by means of the q-axis current generating section 115 after a time t5, the d-axis current Id and the q-axis current Iq are the constant value and the power diagnosis is performed during a period from the time t5 to a time t6, since the battery voltage Bv becomes less than the threshold Bv1 during the period from the time t5 to the time t6, the diagnosis determining section 119 determines that the battery degraded at the time t6, the d-axis current generating section 114 and the q-axis current generating section 115 stop applying the d-axis current Id and the q-axis current Iq after the time t6. In this embodiment, the steering angle θ is less than the threshold θ1, the motor angular velocity ω is less than the threshold ω1, and the steering angle θ is within the given range (−θ1<θ<θ1).

In the case of only the d-axis current, due to limitations of the d-axis current, after the time t4, although it is also considered that the consumption current that is capable of confirming the degradation of the battery voltage Bv becomes insufficient, according to the present invention, since the q-axis current is also applied, it is possible to perform a sure determination.

Figure 7:
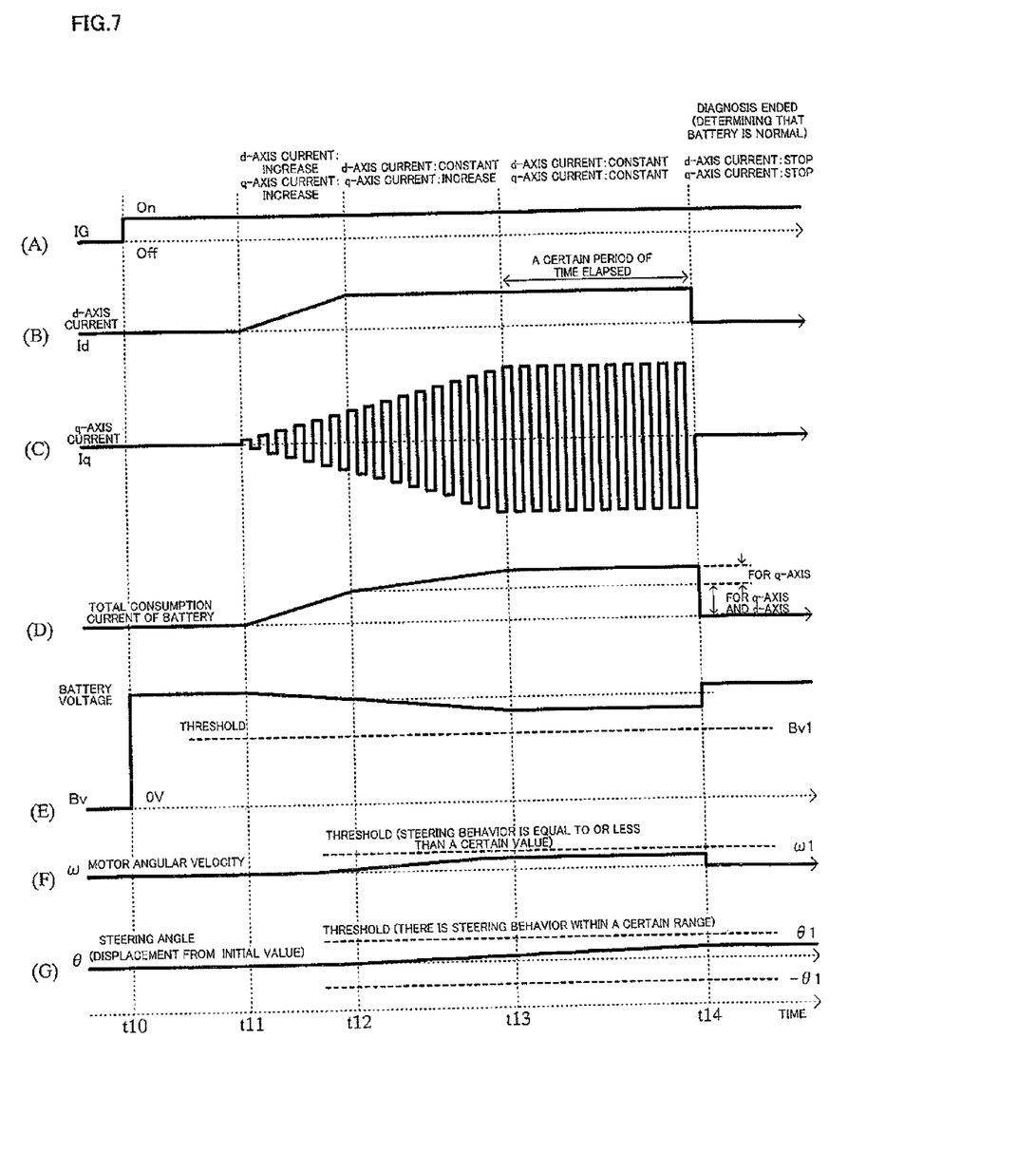
FIG. 7 is a time chart showing an operation example (the second embodiment: battery is normal) of the present invention.

FIG. 7 shows an operation example in the case that the battery voltage Bv is normal. As shown in FIG. 7(A), when the ignition key 11 is switched to "ON" at a time t10, the battery voltage Bv also becomes a given value and electric power is supplied (see FIG. 7(E)). And then, as shown in FIGs. 7(B) and 7(C), the d-axis current Id and the q-axis current Iq are applied at a time t11 and gradually increased (progressively increased), and although the d-axis current Id becomes a constant value after a time t12, the q-axis current Iq gradually increases even after the time t12. Although the battery voltage Bv drops after the time t12, the battery voltage Bv does not become less than the threshold Bv1, the q-axis current Iq also becomes a constant value after a time t13, although the d-axis current Id and the q-axis current Iq are the constant value and the power diagnosis is performed during a period from the time t13 to a time t14, in this embodiment, since during the certain period of time T2 (i.e. the period from the time t13 to the time t14), the battery voltage Bv does not become less than the threshold Bv1, the motor angular velocity ω is less than the threshold ω1, and the steering angle θ is within the given range (−θ1<θ<θ1), the diagnosis determining section 119 determines that the battery is normal at the time t14, the d-axis current generating section 114 and the q-axis current generating section 115 stop generating and applying the d-axis current Id and the q-axis current Iq after the time t14.

Figure 8:
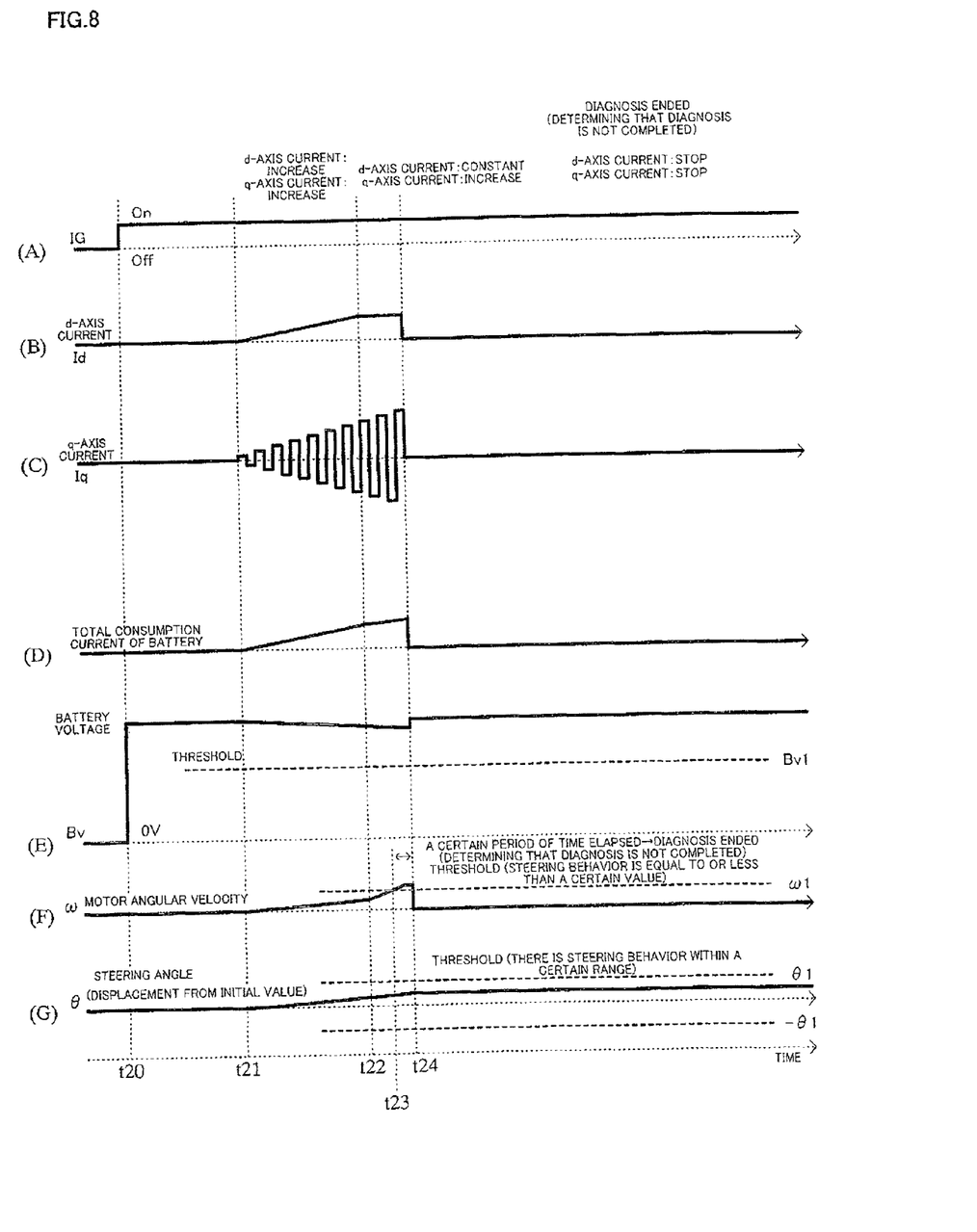
FIG. 8 is a time chart showing an operation example (the third embodiment: diagnosis is not completed) of the present invention.

Further, FIG. 8 shows an operation example in the case that the diagnosis is not completed. As shown in FIG. 8(A), when the ignition key 11 is switched to "ON" at a time t20, the battery voltage Bv also becomes a given value and electric power is supplied (see FIG. 8(E)). And then, as shown in FIGS. 8(B) and 8(C), the d-axis current Id and the q-axis current Iq are generated and applied at a time t21, concurrently, the d-axis current Id and the q-axis current Iq are gradually increased, and although the d-axis current Id becomes a constant value at a time t22, the q-axis current Iq increases even after the time t22. Although the battery voltage Bv drops after the time t22, the battery voltage Bv does not become less than the threshold Bv1. However, since the motor angular velocity ω becomes equal to or more than the threshold ω1 at a time t23, the motor angular velocity determining section 117-2 detects this situation, and at a time t24 after the elapse of a given period of time, the d-axis current generating section 114 and the q-axis current generating section 115 stop generating and applying the d-axis current Id and the q-axis current Iq. And then, the diagnosis determining section 119 determines that the diagnosis is not completed and outputs. Although this embodiment shows a case that the motor angular velocity ω becomes equal to or more than the threshold ω1, in the case that the steering angle θ becomes out of the given range (−θ<θ<θ1), similarly, after the appearance of this case, the d-axis current generating section 114 and the q-axis current generating section 115 stop generating and applying the d-axis current Id and the q-axis current Iq after the elapse of a given period of time, and the diagnosis determining section 119 determines that the diagnosis is not completed and outputs.

Figure 9:
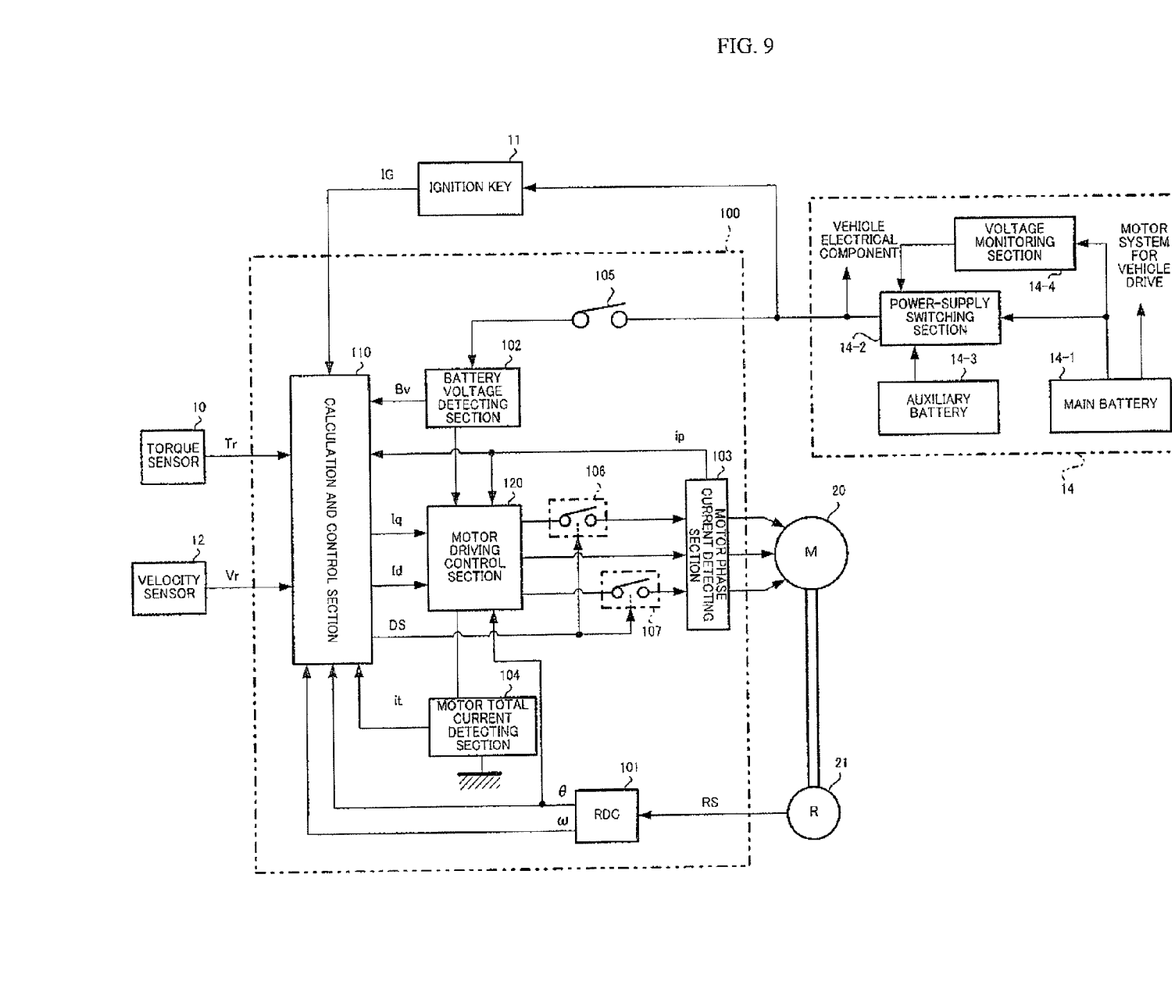
FIG. 9 is a block diagram showing a configuration example of an electric vehicle that can apply the present invention.

FIG. 9 shows a configuration example of an electric vehicle, it is possible to apply the present invention to such an electric vehicle. That is to say, a battery 14 equipped with the electric vehicle has a main battery 14-1 and an auxiliary battery 14-2, and the voltage of the main battery 14-1 is monitored by a voltage monitoring section 14-4. And then, the battery 14 has a power-supply configuration that at the normal time, the power supply is supplied from the main battery 14-1 through a power-supply switching section 14-2, and at the time that the voltage monitoring section 14-4 detects abnormalities or failures in the voltage of the main battery 14-1, the power supply is supplied from the auxiliary battery 14-3 by switching the power-supply switching section 14-2. That is, a power-supply configuration with plural power supplies that switches to the auxiliary battery 14-3 at the abnormal time of the main battery 14-1 to make the backup possible. Here, in general, there is such the main battery 14-1 that has a configuration further divided into multiple parts.

In the normal state, although the main battery 14-1 drives a motor system for vehicle drive, vehicle electrical components and an electric power steering apparatus, at the time of switching to the auxiliary battery 14-3 in accordance with the abnormalities in the voltage of the main battery 14-1, only the vehicle electrical components and the electric power steering apparatus can be driven. Therefore, at the normal time, in a state that abnormalities in the auxiliary battery 14-3 occurring, by switching to the auxiliary battery 14-3 in accordance with the abnormalities in the voltage of the main battery 14-1, since the vehicle electrical components and the electric power steering apparatus can not operate, it is necessary to constantly or periodically perform the battery state diagnosis even with respect to the voltage of the auxiliary battery 14-3.

In the above embodiments, although a diagnosis case when the ignition key 11 is switched to "ON", is described, in a state that the ignition key 11 is switched to "OFF", even by automatically performing the diagnosis by time measurement with a timer etc., the same effect can be obtained.

EXPLANATION OF REFERENCE NUMERALS 1 steering wheel
2 column shaft
3 reduction gears
10 torque sensor
11 ignition key
12 velocity sensor
14 battery
20 motor
21 resolver
100 ECU
101 resolver-to-digital converting circuit (RDC)
102 battery voltage detecting section
103 motor phase current detecting section
104 motor total current detecting section
105 power relay
106,107 motor relay
110 calculation and control section
111 CPU
112-1 inputting section
112-2 outputting section
113 initial diagnosis processing section
114 d-axis current generating section
115 q-axis current generating section
116-1 battery voltage determining section
116-2 diagnosable voltage determining section
117-1 steering angle determining section
117-2 motor angular velocity determining section
117-3 time determining section
118 memory (for example, EEPROM)
119 diagnosis determining section
120 motor driving control section
121 three-phase/two-phase converting section
123 PI control section
124 two-phase/three-phase converting section
125 PWM control section
126 inverter circuit

The invention claimed is:

1. A power state diagnosis apparatus that diagnoses a power state of a vehicle which comprises an electrical control system supplied from a power supply and a motor controlled by a vector control method, comprising:
   a d-axis current generating section that gradually increases a d-axis current to a current value that a steering behavior does not occur and applies said d-axis current;
   a q-axis current generating section that gradually increases a q-axis current that is a rectangular-wave with positive and negative directions to said current value and applies said q-axis current;
   a power supply voltage determining section that determines whether a voltage value of said power supply is equal to or less than a power supply threshold or not;
   a time determining section that determines elapse of the time; and
   a diagnosis determining section that determines degradation of said power supply when said power supply voltage determining section determines that said voltage value is equal to or less than said power supply threshold, and said time determining section determines that a period of time T1 elapses after said voltage value becomes equal to or less than said power supply threshold.

2. A power state diagnosis apparatus according to claim 1, wherein comprising:
 a diagnosable voltage determining section that determines whether a voltage of said power supply is equal to or more than a diagnosable voltage that is necessary to continue said diagnosis or not, and
 said degradation is determined when said diagnosable voltage determining section determines that said voltage of said power supply is equal to or more than said diagnosable voltage.

3. A power state diagnosis apparatus according to claim 1, wherein further comprising: a steering angle determining section that determines whether a steering angle of said motor is equal to or more than a threshold $\theta1$ or not; and
 a motor angular velocity determining section that determines whether a motor angular velocity is equal to or more than a threshold w1 or not, and
 terminating said diagnosis and said diagnosis determining section determines that said diagnosis is not completed when said steering angle determining section determines said steering angle of said motor is equal to or more than said threshold $\theta1$, or when said motor angular velocity determining section determines said motor angular velocity is equal to or more than said threshold $\omega1$.

4. A power state diagnosis apparatus according to claim 2, wherein further comprising: a steering angle determining section that determines whether a steering angle of said motor is equal to or more than a threshold $\theta1$ or not; and
 a motor angular velocity determining section that determines whether a motor angular velocity is equal to or more than a threshold w1 or not, and terminating said diagnosis and said diagnosis determining section determines that said diagnosis is not completed when said steering angle determining section determines said steering angle of said motor is equal to or more than said threshold $\theta1$, or when said motor angular velocity determining section determines said motor angular velocity is equal to or more than said threshold $\omega1$.

5. A power state diagnosis apparatus according to claim 1, wherein said electrical control system is an electric power steering apparatus that drives said motor based on said d-axis current and said q-axis current that are calculated based on at least a steering torque from a torque sensor and provides a steering system with an assist torque.

6. A power state diagnosis apparatus according to claim 2, wherein said electrical control system is an electric power steering apparatus that drives said motor based on said d-axis current and said q-axis current that are calculated based on at least a steering torque from a torque sensor and provides a steering system with an assist torque.

7. A power state diagnosis apparatus according to claim 3, wherein said electrical control system is an electric power steering apparatus that drives said motor based on said d-axis current and said q-axis current that are calculated based on at least a steering torque from a torque sensor and provides a steering system with an assist torque.

\* \* \* \* \*